United States Patent
Vogler et al.

(10) Patent No.: US 6,603,788 B1
(45) Date of Patent: Aug. 5, 2003

(54) RESONATOR FOR SINGLE LINE SELECTION

(75) Inventors: Klaus Wolfgang Vogler, Goettingen (DE); Uwe Stamm, Goettingen (DE)

(73) Assignee: Lambda Physik AG, Goettingen (DE)

( * ) Notice: Subject to any disclaimer, the term of this patent is extended or adjusted under 35 U.S.C. 154(b) by 235 days.

(21) Appl. No.: 09/718,809

(22) Filed: Nov. 22, 2000

Related U.S. Application Data

(60) Provisional application No. 60/166,967, filed on Nov. 23, 1999.

(51) Int. Cl.[7] ................................................. H01S 3/22
(52) U.S. Cl. ........................ 372/57; 372/20; 372/19; 372/102; 372/100; 372/98
(58) Field of Search ........................... 372/57, 20, 98, 372/100, 102, 19

(56) References Cited

U.S. PATENT DOCUMENTS

| | | | |
|---|---|---|---|
| 3,471,800 A | 10/1969 | Congleton et al. | 331/94.5 |
| 3,546,622 A | 12/1970 | Peterson et al. | 331/94.5 |
| 3,609,586 A | 9/1971 | Danielmeyer et al. | 331/94.5 |
| 3,609,856 A | 10/1971 | Eckert | 29/473.1 |
| 3,868,592 A | 2/1975 | Yarborough et al. | 331/94.5 |
| 4,393,505 A | 7/1983 | Fahlen | 372/57 |
| 4,399,540 A | 8/1983 | Bucher | 372/28 |
| 4,611,270 A | 9/1986 | Klauminzer et al. | 364/183 |
| 4,616,908 A | 10/1986 | King | 350/576 |
| 4,691,322 A | 9/1987 | Nozue et al. | 372/82 |
| 4,696,012 A | 9/1987 | Harshaw | 372/99 |

(List continued on next page.)

FOREIGN PATENT DOCUMENTS

| | | | |
|---|---|---|---|
| DE | 298 22 090 U 1 | 3/1999 | H01S/3/08 |
| DE | 299 07 349 U 1 | 8/2000 | H01S/3/086 |

(List continued on next page.)

OTHER PUBLICATIONS

Finkelstein et al., "A Rectilinear Transmission Grating and Applications," *JOSA*, vol. 43., 1953., pp. 335.

(List continued on next page.)

*Primary Examiner*—Leon Scott, Jr.
(74) *Attorney, Agent, or Firm*—Sierra Patent Group, Ltd.; Andrew V. Smith

(57) ABSTRACT

An excimer or molecular fluorine laser system includes a discharge chamber filled with a laser gas mixture at least including a halogen gas and a buffer gas, a plurality of electrodes within the discharge chamber connected to a power supply circuit for energizing the gas mixture, and a resonator for generating a laser beam including a line-narrowing module on one side of the discharge chamber for reducing a bandwidth of the laser beam. The laser beam is output coupled from the resonator on the same side of the discharge chamber as the line-narrowing module and preferably after the beam is line-narrowed at the line-narrowing module. A substantially total intensity of the laser beam impinges upon a line-narrowing optical element of the line-narrowing module and is thereby line-narrowed. The resonator preferably includes at least one aperture for reducing a bandwidth of the laser beam. The line-narrowing optical element serves to disperse the beam such that only a selected portion of the spectral distribution of the beam incident at the line-narrowing optical element remains within a beam acceptance angle.

67 Claims, 3 Drawing Sheets

U.S. PATENT DOCUMENTS

| | | | | |
|---|---|---|---|---|
| 4,803,696 A | 2/1989 | Pepper et al. | | 372/95 |
| 4,829,536 A | 5/1989 | Kajiyama et al. | | 372/57 |
| 4,856,018 A | 8/1989 | Nozue et al. | | 372/98 |
| 4,860,300 A | 8/1989 | Baumler et al. | | 372/57 |
| 4,873,692 A | 10/1989 | Johnson et al. | | 372/20 |
| 4,905,243 A | 2/1990 | Lokai et al. | | 372/32 |
| 4,926,428 A | 5/1990 | Kajiyama et al. | | 372/20 |
| 4,972,429 A | 11/1990 | Herbst | | 372/100 |
| 4,975,919 A | 12/1990 | Amada et al. | | 372/33 |
| 4,977,563 A | 12/1990 | Nakatani et al. | | 372/32 |
| 5,025,445 A | 6/1991 | Anderson et al. | | 372/20 |
| 5,095,492 A | 3/1992 | Sandstrom | | 372/102 |
| 5,142,543 A | 8/1992 | Wakabayashi et al. | | 372/32 |
| 5,150,370 A | 9/1992 | Furuya et al. | | 372/106 |
| 5,221,823 A | 6/1993 | Usui | | 219/121.78 |
| 5,226,050 A | 7/1993 | Burghardt | | 372/20 |
| 5,337,330 A | 8/1994 | Larson | | 372/86 |
| 5,373,515 A | 12/1994 | Wakabayashi et al. | | 372/20 |
| 5,396,514 A | 3/1995 | Voss | | 372/57 |
| 5,404,366 A | 4/1995 | Wakabayashi et al. | | 372/29 |
| 5,406,571 A | 4/1995 | Bucker et al. | | 372/20 |
| 5,440,574 A | 8/1995 | Sobottke et al. | | 372/34 |
| 5,440,578 A | 8/1995 | Sandstrom | | 372/59 |
| 5,450,207 A | 9/1995 | Fomenkov | | 356/416 |
| 5,479,431 A | 12/1995 | Sobottke et al. | | 372/92 |
| 5,532,880 A | 7/1996 | Robb | | 359/665 |
| 5,535,233 A | 7/1996 | Mizoguchi et al. | | 372/87 |
| 5,557,629 A | 9/1996 | Mizoguchi et al. | | 372/87 |
| 5,559,584 A | 9/1996 | Miyaji et al. | | 355/73 |
| 5,559,816 A | 9/1996 | Basting et al. | | 372/27 |
| 5,596,456 A | 1/1997 | Luecke | | 359/831 |
| 5,596,596 A | 1/1997 | Wakabayashi et al. | | 372/102 |
| 5,625,499 A | 4/1997 | Chen | | 359/831 |
| 5,646,954 A | 7/1997 | Das et al. | | 372/55 |
| 5,652,681 A | 7/1997 | Chen et al. | | 359/831 |
| 5,659,419 A | 8/1997 | Lokai et al. | | 359/330 |
| 5,663,973 A | 9/1997 | Stamm et al. | | 372/20 |
| 5,684,822 A | 11/1997 | Partlo | | 372/95 |
| 5,729,562 A | 3/1998 | Birx et al. | | 372/38 |
| 5,729,565 A | 3/1998 | Meller et al. | | 372/87 |
| 5,761,236 A | 6/1998 | Kleinschmidt et al. | | 372/100 |
| 5,763,855 A | 6/1998 | Shioji | | 219/121.84 |
| 5,802,094 A | 9/1998 | Wakabayashi et al. | | 372/57 |
| 5,811,753 A | 9/1998 | Weick et al. | | 219/121.78 |
| 5,818,865 A | 10/1998 | Watson et al. | | 372/86 |
| 5,835,520 A | 11/1998 | Das et al. | | 372/57 |
| 5,852,627 A | * 12/1998 | Ershov | | 372/108 |
| 5,856,991 A | 1/1999 | Ershov | | 372/57 |
| 5,898,725 A | 4/1999 | Fomenkov et al. | | 372/102 |
| 5,901,163 A | * 5/1999 | Ershov | | 372/20 |
| 5,914,974 A | 6/1999 | Partlo et al. | | 372/38 |
| 5,917,849 A | 6/1999 | Ershov | | 372/102 |
| 5,936,988 A | 8/1999 | Partlo et al. | | 372/38 |
| 5,940,421 A | 8/1999 | Partlo et al. | | 372/38 |
| 5,946,337 A | 8/1999 | Govorkov et al. | | 372/92 |
| 5,949,806 A | 9/1999 | Ness et al. | | 372/38 |
| 5,970,082 A | * 10/1999 | Ershov | | 372/102 |
| 5,978,346 A | 11/1999 | Mizuno et al. | | 369/112 |
| 5,978,391 A | 11/1999 | Das et al. | | 372/20 |
| 5,978,394 A | 11/1999 | Newman et al. | | 372/32 |
| 5,978,409 A | 11/1999 | Das et al. | | 372/100 |
| 5,982,795 A | 11/1999 | Rothweil et al. | | 372/38 |
| 5,982,800 A | 11/1999 | Ishihara et al. | | 372/57 |
| 5,991,324 A | 11/1999 | Knowles et al. | | 372/57 |
| 5,999,318 A | 12/1999 | Morton et al. | | 359/572 |
| 6,005,880 A | 12/1999 | Basting et al. | | 372/38 |
| 6,014,206 A | 1/2000 | Basting et al. | | 356/138 |
| 6,014,398 A | 1/2000 | Hofmann et al. | | 372/60 |
| 6,016,479 A | 1/2000 | Taricani, Jr. | | 705/19 |
| 6,018,537 A | 1/2000 | Hofmann et al. | | 372/25 |
| 6,020,723 A | 2/2000 | Desor et al. | | 320/166 |
| 6,028,872 A | 2/2000 | Partlo et al. | | 372/38 |
| 6,028,879 A | 2/2000 | Ershov | | 372/57 |
| 6,028,880 A | 2/2000 | Carlesi et al. | | 372/58 |
| 6,061,382 A | 5/2000 | Govorkov et al. | | 372/101 |
| 6,128,323 A | 10/2000 | Myers et al. | | 372/38 |
| 6,137,821 A | * 10/2000 | Ershov | | 372/19 |
| 6,154,470 A | 11/2000 | Basting et al. | | 372/19 |
| 6,240,110 B1 | 5/2001 | Ershov | | 372/20 |
| 6,421,365 B1 | * 7/2002 | Kleinschmidt et al. | | 372/57 |
| 6,426,966 B1 | * 7/2002 | Basting et al. | | 372/19 |

FOREIGN PATENT DOCUMENTS

| | | | | |
|---|---|---|---|---|
| EP | 1 041 689 A1 | 10/2000 | | H01S/3/1055 |
| EP | 1 102 368 A2 | 5/2001 | | H01S/3/081 |
| EP | 1 119 083 A2 | 7/2001 | | H01S/3/08 |
| JP | 60 16479 | 1/1985 | | H01S/3/081 |
| JP | 8 274399 | 11/1986 | | H04S/3/104 |
| JP | 62 160783 | 7/1987 | | H01S/3/115 |
| JP | 2 152288 | 6/1990 | | H01S/3/106 |

OTHER PUBLICATIONS

McKee, T., "Spectral–narrowing Techniques for Excimer Laser Oscillators," *Can J Phys*, 1985, vol. 63., pp. 214–219.

Traub, W., "Constant–dispersion Grism Spectrometer for Channeled Spectra," *Optical Society of America*, Sep. 1990, vol. 7., No. 9., pp. 1779–1791.

Demtroder, W., Laser Spectroscopy Springer, *Berlin Heidelberg*, 1996, pp. 99–221.

Hultzsch, R., "Gitterprismen," *Photonik*, Sep. 1998., pp. 40–41. This publication is in German.

Geyer et al., Double Gratings–Prism, *Astr. Astraphys.*, vol. 148., pp. 312–316.

Finkelstein et al., "A Rectilinear Transmission Grating and Applications," *JOSA*, vol. 43., 1953., pp. 335.

Watts, J.K., "Theory of Multiplate Resonant Reflectors," *Applied Optics*, Aug. 1968, vol. 7, No. 8., pp. 1521–1523.

M. Born, et al., Principles of Optics, at p. 325, Pergamon, 1970.

Bloom, A.L., "Modes of a Laser Resonator Containing Tilted Birefringent Plates," *Journal of the Optical Society of America*, vol. 64, No. 4, Apr. 1974.

Okada, M., et al., "Electronic Tunig of Dye Lasers by an Electrooptic Birefringent Fabry–Perot Etalon," *Optics Communications*, vol. 14, No. 1, May 1975.

Rice, J.K., "VUV Emissions from Mixtures of F2 and the Noble Gasses—A Molecular F2 laser at 1575 Aa)," *Applied Physics Letters*, vol. 31, No. 1, Jul. 1, 1977.

Saika, S., "Nitrogen–Laser–Pumped Single–Mode Dye Laser," *Applied Physics*, 1978.

Woodworth, J.R., ete al., "An Efficient, High Power F2 Laser Near 157 nma)," *The Journal of Chemical Physics*, vol. 69, Sep. 15, 1978.

S. Sumida, et al., "Novel Neutral Atomic Fluorine Laser Lines in a High–pressure Mixture of F2 and He," *Journal of Applied Physics*, vol. 50, No. 6, Jun. 1979.

Pummer, H., et al., "Discharge Pumped F2 Laser at 1580 A", *Optics Communications*, vol. 28, No. 1, Jan. 1979.

Hohla, K., et al., "CIF and F2: Two New Ultra–violet Laser Systems," *Optics and Laser Technology*, vol. 11, No. 6, Dec. 1979.

Hutchinson, M.H.R., "Vacuum Ultraviolet Excimer Lasers," *Applied Optics VUV VI*, vol. 19, No. 23, Dec. 1, 1980, pp. 3883–3888.

R. Sadighi–Bonabi, et al., "Gain and Saturation of the Atomic Fluorine Laser," *Journal of Applied Physics*, vol. 53, No. 5, May 1982.

S. Marcus, "Cavity Dumping and Coupling Modulation of an Etalon–Coupled CO2 Laser," *J. Appl. Phys.*, vol. 63, No. 9, Sep. 1982.

Koprinkov, I.G., et al., "Intense Laser Generation from an Atomic–Fluorine," *Applied Physics*, vol. B33, No. 4, Apr. 1984.

A.C. Cefalas, et al., "Gain Measurements at 157 nm in an F2 Pulsed Discharge Molecular Laser," *Optics Communications*, vol. 55, No. 6, Oct. 15, 1985.

E. Armandillo, et al., "Simple, Compact, High–repetition Rate XeCI Laser," *Review of Scientific Instruments*, vol. 56, No. 5, Part 1, May 1985.

McKee, T., "Spectral–narrowing Techniques for Excimer Laser Oscillators," *Can J Phys*, 1985, vol. 63., pp. 214–219.

V.N. Ishchenko, et al., "High–power Efficient Vacuum Ultraviolet F2 Laser Excited by an Electric Discharge," *Soviet Journal of Quantum Electronics*, vol. 16, No. 5, May 1986.

ZOS, Akademie der Wissenschaften der DDR, Zentralinstitut fur Optik und Wissenschaften der DDR, Oktober 1987, "Leistungastarker atomarer Fluorlaser im roten Spektralbereich," Jurgen Lademann, Roland Kunig, Wadim Saidow, Rainer Weidauer.

H. Lengfellner, et al., "Generation of Tunable Pulsed Microwave Radiation by Nonlinear Interaction of Nd:YAG Laser Radiation in GaP Crystals," *Optics Letters*, vol. 12, No. 3, Mar. 1987.

Wani, K., et al., Narrow–band KrF Excimer Laser—Tunable and Wavelength Stabilized, *SPIE —The International Society for Optical Engineering, Excimer Beam Applications*, vol. 998, Sep. 1988, Boston, Massachusetts.

Uematsu, T, et al., "Theoretical Simulation of a Discharge–pumped F2 Excimer Laser," *Discharge–Pumped Excimer Laser Research in Japan*, Apr. 1988.

McKee, T.J., et al., "Line–narrowed Industrial Excimer Laser for Microlithography," *Conference on Lasers and Electro–Optics, 1989 Technical Digest Series*, vol. 11, Apr. 24–29, 1989, Baltimore, Maryland.

Yamada, K., et al., "High Power Discharge–pumped F2 Laser ," *Lasers and Electro–Optics Society Annual Meeting Conference Proceedings, Leos '89*, Oct. 17–20, 1989.

Yamada, K., et al., "High–power Discharge–pumped F2 Molecular Laser," *Applied Physics Letters*, vol. 54, vol. 7, Feb. 13, 1989.

Wataru Sasaki, et al., "Intense VUV–XUX Generation from Rare Gas Excimers," *Conference on Lasers and Electro–Optics, 1989 Technical Digest Series*, vol. 11, May 24–28, 1989.

Shaw, "Excimer Laser Resonator," Shaw, "Excimer Laser Resonator," *Physics and Technology of Laser Resonators*, Bristol New York, 1989, pp. 244–245.

Magni, 37 Resonator with Variable Reflectivity Mirrors, in Shaw, at pp. 94–105.

Science Report, Lambda Physik, No. 3, Nov. 1990, "Breakthrough in F2 Laser Technology" pp. 1–4.

F. Voss, "Optimierung der VUV–Emission bei 157 nm (F2–Linie) bei Entladungs—gepemten Excimerlasern," *Verhanlungen*, Mar. 1990, Physikertagung Munchen 1990., pp. 450–451.

Kakehata, M., "High Specific Output Energy Operation of a Vacuum Ultraviolet Molecular Fluorine Laser Excited at 66 MW/cm3 by an Electric Discharge," *Applied Physics Letters*, vol. 56, No. 26.

Kakehata, M., et al., "Frequency up–conversion of a Discharge Pumped Molecular Fluorine Laser by Stimulated Raman Scattering in H2," *Gas Flow and Chemical Lasers, SPIE*, vol. 1397, Sep. 10–14, 1990.

K. Komatsu, et al., "Spectroscopic Comparison Between Low and High Pressure Discharge Pumped Xe Atomic Lasers," *Conference on Lasers and Electro–optics*, 1990 Technical Digest Series, vol. 7, May 21–25, 1990.

C. Skordoulis, et al., "Amplification Characteristics of a Discharge Excited F2 Laser," *Journal of Modern Optics*, vol. 37, No. 4, Apr. 1990.

Traub, W., "Constant–dispersion Grism Spectrometer for Channeled Spectra," *Optical Society of America*, Sep. 1990, vol. 7., No. 9., pp. 1779–1791.

Highlights, Lambda Physik, No. 29, Jun. 1991, "VUV Spectroscopy by Frequency Trippling" pp. 1–6.

Momma, C., "Stimulated Raman Scattering of a F2–Laser in H2," *Institut Fur Quantenopik*, Oct. 22, 1991.

Tagungsband, Vom. 24, Bis. 26, Sep. 1991, Abstract: "Vakuum UV Molekullaser mit hoher Ausgangsleistung" 3 pages.

Kakehata, M., "Efficiency Characterization of Vacuum Ultraviolet Molecular Fluorine (F2) Laser (157nm) Excited by an Intense Electric Discharge," *IEEE Journal of Quantum Electronics*, Nov. 1991, vol. 27, No. 11.

Highlights, Lambda Physik, No. 33, Feb. 1992, "VUV Strokes and Anti–Stokes Raman Lines Derived from an F2 Laser" 5 pages.

S.M. Hooker, et al., "Influence of Cavity Configuration on the Pulse Energy of a High–Pressure Molecular Fluorine Laser," *Applied Physics B Photo–physics and Laser Chemistry*, vol. 1, 1992.

Bastiaens, H.M.J., et al., "Small–signal Gain Measurements in an Electron Beam Pumped F2 Laser," *Applied Physics Letters*, vol. 63, No. 4, Jul. 26, 1993.

Highlights Lambda Physik, Apr. 1993, "Excimer Laser Based Microstructuring Using Mask Projection Technique," U. Sarbach.

High Power Laser & Particle Beams, vol. 6, No. 4, Series No. 24, Nov. 15, 1994, 12 pages in Japanese.

Highlights, Lambda Physik, No. 43, Jan. 1994, "Photochemical Modification of Fluorocarbon Resin to Generate Adhesive Properties" pp. 1–6.

F.T.J.L. Lankhorst, et al., "Long Pulse Electron Beam Pumped Molecular F2–Laser," *Journal of Applied Physics*, vol. 77, Jan. 1–15, 1995.

Demtroder, W., Laser Spectroscopy Springer, *Berlin Heidelberg*, 1996, pp. 99–221.

Ohwa, M., "Theoretical Evaluation of High-efficiency Operation of a Discharge-pumped Vacuum-ultraviolet F2 Lasers," *Applied Optics Letters*, vol. 51, No. 13, Sep. 28, 1997.

Kitamura, et al., "Small-signal Gain Measurements in a Discharge-pumped F2 Laser," *Journal of Applied Physics*, vol. 81, No. 6, Mar. 1997, pp. 2523–2528.

Giuri, et al., "Output Coupler Design of Unstable Cavities for Excimer Lasers," *Optics*, 1997, 1143–1148.

Hultzsch, R., "Gitterprismen," *Photonik*, Sep. 1998., pp. 40–41. This publication is in German.

Geyer et al., Double Gratings–Prism, *Astr. Astraphys.*, vol. 148., pp. 312–316, 1985.

Kakehata, M. et al., "CTUH15 Experimental Study of Tunability of a Discharge Pumped Molecular Fluorine Laser," *CLEO 90/Tuesday Poster*, pp. 106–108, 1990.

D. Basting, et al., "Processing of PTFE with High Power VUV Laser Radiation".

* cited by examiner

RESONATOR FOR SINGLE LINE SELECTION

PRIORITY

This application claims the benefit of priority to U.S. provisional patent application No. 60/166,967, filed Nov. 23, 1999.

BACKGROUND OF THE INVENTION

1. Field of the Invention

The invention relates to line-narrowed excimer and molecular fluorine laser systems, and particularly to line-narrowing at an output coupling side of the laser resonator.

2. Discussion of the Related Art

Semiconductor manufacturers are currently using deep ultraviolet (DUV) lithography tools based on KrF-excimer laser systems operating around 248 nm, as well as the following generation of ArF-excimer laser systems operating around 193 nm. The ArF and KrF lasers have a broad characteristic bandwidth around 600 pm (FWHM). Vacuum UV (VUV) will use the F2-laser which characteristically emits two or three closely spaced lines around 157 nm.

It is important for their respective applications to the field of sub-quarter micron silicon processing that each of the above laser systems become capable of emitting a narrow spectral band of known bandwidth and around a very precisely determined and finely adjustable absolute wavelength.

Techniques for reducing bandwidths by special resonator designs to less than 100 pm (for ArF and KrF lasers) for use with all-reflective optical imaging systems, and for catadioptric imaging systems to less than 0.6 pm, are being continuously improved upon.

For the application of excimer lasers as light sources for steppers and/or scanners for photographic microlithography, it is desired to have laser emission within a range that is much small than the natural linewidth which is approximately 300 to 400 pm for ArF and KrF lasers. The extent of the desired line narrowing depends on the imaging optics of the stepper/scanner devices. The desired bandwidth for catadioptic systems is less than around 50 pm, and for refractive optics it is less than around 0.8 pm. Currently, used systems for the KrF laser emitting around 248 nm have a bandwidth around 0.6 pm. To improve the resolution of the projection optics, a narrower laser bandwidth is desired for excimer laser systems of high reliability and very small bandwidth of 0.4 pm or less.

A line-narrowed excimer or molecular fluorine laser used for microlithography provides an output beam with specified narrow spectral linewidth. It is desired that parameters of this output beam such as wavelength, linewidth, and energy and energy dose stabilty be reliable and consistent. Narrowing of the linewidth is generally achieved through the use of a linewidth narrowing and/or wavelength selection and wavelength tuning module (hereinafter "line-narrowing module") consisting most commonly of prisms, diffraction gratings and, in some cases, optical etalons.

The line-narrowing module typically functions to disperse incoming light angularly such that light rays of the beam with different wavelengths are reflected at different angles. Only those rays fitting into a certain "acceptance" angle of the resonator undergo further amplification, and eventually contribute to the output of the laser system.

For the broadband excimer lasers such as the ArF and KrF lasers mentioned above, the central wavelength of the line-narrowed output beam may be tuned within their respective characteristic spectra. Tuning is typically achieved by rotating the grating or highly reflective (HR) mirror of the line-narrowing module. It is recognized in the present invention that it is also desirable to have tuning within a single selected line of the molecular fluorine laser for very narrow bandwidth, precise wavelength applications.

Line-narrowing is typically performed at the rear optics module of the laser resonator, while output coupling of the laser beam from the laser resonator is typically performed at the front optics module, or at the opposite side of the discharge chamber as the line-narrowing module. FIG. 1 illustrates this principle and schematically shows a conventional line-narrowed laser resonator. The resonator includes a discharge chamber 1 having line-narrowing optics such as a line-selecting prism 4 and a highly reflective mirror 2 or a beam expander and a grating on one side of the discharge chamber 1, and an output coupler 3 on the other side of the discharge chamber 1. A beam separation box 5 is also shown in FIG. 1 including beam splitters 6 and 7 and an energy detector 8, for monitoring the energy of the output beam 9. A disadvantage of these configurations is that radiation emanating from the discharge chamber toward the front optics module, and which is directly output coupled on a first pass, never traverses the line-narrowing optics in the rear optics module. This background radiation serves to limit the attainable degree of the spectral purity of the beam. It is recognized in the present invention that it would be desirable to suppress this background radiation to improve the spectral purity of the beam.

Excimer and molecular fluorine laser systems also typically include feedback wavelength and energy monitoring components, such as the energy monitoring components illustrated in FIG. 1. In addition, beam steering optics are typically included for maintaining a proper alignment of the beam. Each of these components is disposed outside of the resonator at the output coupling end of the resonator. Thus, these laser systems include complex electro-optical units at both the front and rear of the discharge chamber. It is desired to simplify the laser resonators of excimer and molecular fluorine laser systems.

Another development goal for excimer and molecular fluorine laser systems is to have system that operate at higher and higher repetition rates. Greater throughput may be achieved in this way. However, optical components such as apertures within the resonator are more susceptible at higher repetition rate to heating and related distortions. It is recognized that at these higher repetition rates it is desirable to reduce or prevent thermal heating of apertures within the resonator.

SUMMARY OF THE INVENTION

It is therefore an object of the invention to provide an excimer or molecular fluorine laser system wherein background radiation originating from a single pass gain in the discharge chamber is suppressed to improve the spectral purity of the output beam.

It is a further object of the invention to provide a simplified laser resonator for an excimer or molecular fluorine laser system.

It is another object of the invention to reduce or prevent thermal heating of apertures that may part of a resonator of a laser operating at high repetition rates such as 2–8 kHz or more.

In accord with these objects, an excimer or molecular fluorine laser system is provided having a discharge chamber filled with a laser gas mixture at least including a halogen gas and a buffer gas, a plurality of electrodes within the discharge chamber connected to a power supply circuit for energizing the gas mixture, and a resonator for generating a laser beam including a line-narrowing module on one side of the discharge chamber for reducing a bandwidth of the laser beam. The laser beam is output coupled from the resonator on the same side of the discharge chamber as the line-narrowing module and after the beam is line-narrowed at the line-narrowing module. A substantially total intensity of the laser beam impinges upon a line-narrowing optical element of the line-narrowing module and is thereby line-narrowed. The line-narrowing optical element serves to disperse the beam such that only a selected portion of the spectral distribution of the beam incident at the line-narrowing optical element remains within a beam acceptance angle.

In further accord with the above objects, an excimer or molecular fluorine laser system is provided having a discharge chamber filled with a laser gas mixture at least including a halogen gas and a buffer gas, a plurality of electrodes within the discharge chamber connected to a power supply circuit for energizing the gas mixture, and a resonator for generating a laser beam including a line-narrowing module on one side of the laser chamber and at least one aperture for reducing a bandwidth of the laser beam. The laser beam is output coupled from the resonator on the same side as the line-narrowing module. A substantially total intensity of the laser beam impinges upon a line-narrowing optical element of the line-narrowing module and is thereby line-narrowed. The line-narrowing optical element serves to disperse the beam such that only a selected portion of the spectral distribution of the beam incident at the line-narrowing optical element remains within a beam acceptance angle as defined at least in part by the aperture.

In further accord with the above objects, a high repetition rate excimer or molecular fluorine laser system is provided including a discharge chamber filled with a laser gas mixture at least including a halogen gas and a buffer gas, a plurality of electrodes within the discharge chamber connected to a power supply circuit for energizing the gas mixture at a repetition rate of at least 2 kHz, a resonator for generating a laser beam including at least one line-narrowing optical element and at least one aperture for reducing a bandwidth of the laser beam. The line-narrowing optical element serves to disperse the beam such that only a selected portion of the spectral distribution of the beam incident at the line-narrowing optical element remains within a beam acceptance angle defined in part by the aperture. The aperture is cooled, thereby resisting heat build-up due to exposure to the high repetition rate beam, to prevent distortions due to thermal heating of the aperture. Such cooling of the aperture is particularly preferred for laser systems operating at 4 kHz or more, and more particularly for laser systems operating at 8 kHz or more.

In further accord with the above objects, an excimer or molecular fluorine laser system is provided including a discharge chamber filled with a laser gas mixture at least including a halogen gas and a buffer gas, a plurality of electrodes within the discharge chamber connected to a power supply circuit for energizing the gas mixture, and a resonator for generating a laser beam including at least one line-narrowing optical element on one side of the discharge chamber for reducing a bandwidth of the laser beam. The laser beam is output coupled from the resonator on the same side of the discharge chamber as the at least one line-narrowing optical element, and the line-narrowing optical element is disposed in a same modular unit from which the beam is output coupled. A substantially total intensity of the laser beam impinges upon the line-narrowing optical element of the line-narrowing module and is thereby line-narrowed. The line-narrowing optical element serves to disperse the beam such that only a selected portion of the spectral distribution of the beam incident at said line-narrowing optical element remains within a beam acceptance angle. Preferably, the beam is output coupled after the beam is line-narrowed at the at least one line-narrowing optical element.

DETAILED DESCRIPTION OF THE PREFERRED EMBODIMENTS

Figure 2:
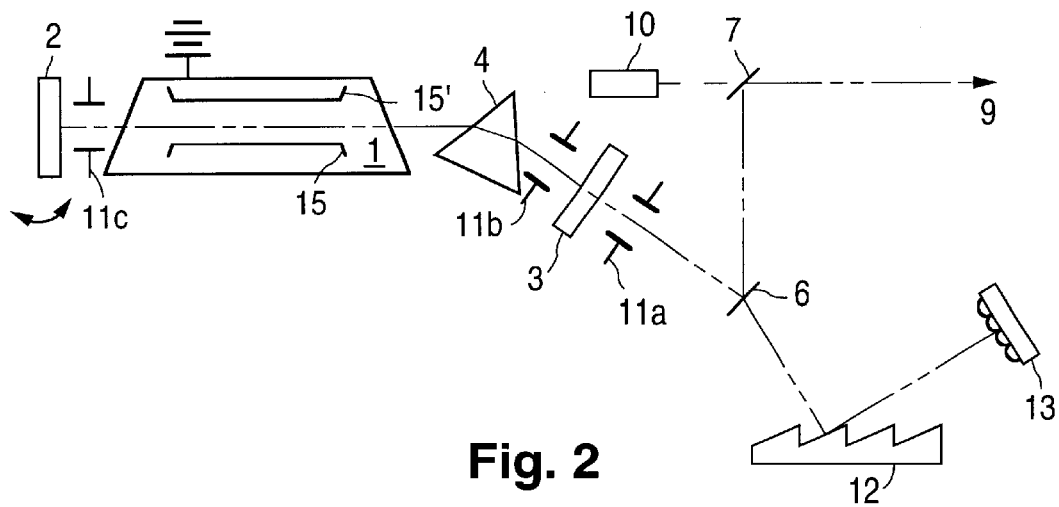
FIG. 2 schematically shows a line-narrowed laser resonator according to a first preferred embodiment.

FIG. 2 schematically shows a line-narrowed laser resonator according to a first embodiment of the invention. The resonator shown in FIG. 2 includes a discharge chamber 1 filled with a laser gas mixture and having a pair of main discharge electrodes 15 connected to a power supply circuit for energizing the gas mixture. The discharge chamber 1 preferably has Brewster windows or windows inclined at a smaller angle such as 5°. Further details of the preferred discharge chamber 1 and associated components are described below with respect to the preferred laser system schematically shown at FIG. 6. The resonator of FIG. 2 also includes a highly reflective (HR) mirror 2 on the rear side of the discharge chamber 1.

The HR mirror 2 is preferably rotatably for tuning the laser wavelength, but may be fixed while tuning is performed in the front optics module of the resonator. The HR mirror 2 may be replaced with a reflective etalon (U.S. patent application Ser. No. 09/317,527, which is assigned to the same assignee as the present application and is hereby incorporated by reference). The etalon would serve to further narrow the beam line-narrowed also by a dispersive element preferably located at the front side of the resonator, or to select one of mulitple closely spaced lines of emission and/or to narrow a line selected by a dispersive element, e.g., when the gas mixture is that of a molecular fluorine laser emitting around 157 nm. With respect to the latter mentioned function, the etalon may be tunable within the selected line in a very narrow band molecular fluorine laser, wherein output power could be regained with a power amplifier, such as described in U.S. patent application Ser. Nos. 09/599,130 and 60/228,184, each of which is assigned to the same assignee and is hereby incorporated by reference for this purpose.

On the front side of the discharge chamber 1 is a partially reflective output coupler 3 and a dispersive prism 4 within the resonator before the output coupler 3. Alternatively, the prism 4 may be replaced by a transmission grating or grism, and a beam expander, preferably including one or more beam expanding prisms, may be disposed before the dispersive prism 4, grating or grism. A pair of beam steering mirrors 6 and 7 are shown for redirecting the output beam 9. A guiding beam from a reference laser 10 is used for controlling the alignment of the output beam 9. For this purpose, the beam steering mirror 7 transmits the guiding beam emitted from the reference laser 10, which may be, e.g., a He-Ne laser.

The beam steering mirror 6 also preferably transmits a small portion of the incident beam. This transmitted beam portion is then incident at a grating 12 that disperses the beam portion. Alternatively, the grating 12 can be replaced by a monitor etalon. A detector 13, such as an array detector, then detects the dispersed beam from the grating 12, or interference image of the monitor etalon, for measuring the spectral distribution of the beam 9.

Advantageously, line-narrowing and/or selection optics 4, the output coupler 3, the wavelength monitoring components 12 and 13 and the beam guiding reference laser 10 and associated optics 6 and 7 may all be included in a same front optics module of the preferred laser system.

Three apertures 11a, 11b and 11c are also shown in FIG. 2. The first aperture 11a is shown disposed outside the resonator after the output coupler 3. The second aperture 11b is shown disposed between the dispersion prism 4 and the output coupler 3. The third aperture 11c is shown disposed between the discharge chamber 1 and the HR mirror 2. Although all three apertures may be included, only one or two of the apertures 11a, 11b and 11c may be included. The preferred arrangement includes at least one of the apertures 11a, 11b or 11c, and most preferably aperture 11b, for reducing the acceptance angle of the beam by blocking unselected portions dispersed by the preferred dispersive element, or the dispersion prism 4. An aperture (not shown) may also be positioned between the discharge chamber 1 and the dispersion prism 4.

Being disposed within the resonator and after the dispersion prism 4, the aperture 11b blocks unselected portions of the dispersed beam that are either outcoupled or reflected at output coupler 3. An advantage is that the unselected portions are taken out of the beam before the beam re-enters the discharge chamber 1 on a second pass. Whether one, two or three of the apertures 11a, 11b and 11c are used, one or more of the apertures 11a–11c may be adjustable for matching or adapting the divergence, such as is described at U.S. patent application Ser. No. 09/130,277, which is assigned to the same assignee as the present application and is hereby incorporated by reference. As discussed in the '277 application, a feedback loop may be used for controlling the size and/or alignment of the one or more preferred apertures 11a–11c being used. As for the configuration of any aperture 11a–11c being used, such configuration is preferably as set forth in U.S. Pat. No. 5,161,238, which is hereby incorporated by reference.

Alternatively or in combination with being configured as set forth in the '238 patent, any of the apertures 11a–11c may be water-cooled, cryogenically-cooled or otherwise cooled by a fan or by other electrical or mechanical means. One skilled in the art would understand that means may be configured for thermally connecting a water flow, such as by having a flowing pathway for the water through or around the aperture, or by connecting a cryogenic bath such as of liquid nitrogen to the aperture directly of via a thermally conductive material such as a metal, to any of the apertures 11a–11c. In addition, a fan or a fan duct or other gas inlet or outlet port could be disposed near the aperture for blowing air or preferably an inert gas such as nitrogen, argon or helium at the aperture. Such cooling may also be combined with reflecting the beam away from the acceptance angle of the beam according to the '238 patent.

At high repetition rates for excimer or molecular flourine lasers, such as 2 kHz or more, and more particularly for 4 kHz or higher, and wherein 8 kHz or higher repetition rate excimer or molecular fluorine lasers are being developed, it is preferred to cool the aperture rather than having the aperture heat up too much, whereby distortions caused by heating of the aperture would be undesirable. It is also preferred that any of the apertures 11a–11c being used avoid reflecting light back into the acceptance angle of the beam. Accordingly, the apertures preferably reflect the unselected portions away from the acceptance angle of the beam, and alternatively, the apertures at least partially absorb the radiation. Particularly if the aperture is absorptive, to a greater than insubstantial extent, of the unselected laser radiation, cooling of any of the apertures 11a–11c is preferred. The above description of the cooling of the apertures 11a–11c may be used with an otherwise conventional resonator setup, and is not solely useful only with the resonator arrangements described in the preferred embodiments herein.

As noted above, a dispersion prism 4 is preferably used for line selection/narrowing in the first preferred embodiment illustrated at FIG. 2. The resonator is adjusted for a selected spectral region such that the output beam 9 contains only the selected line. Particularly for high repetition rates, where there may more than insubstantial thermal heating of the prism 4 such that thermal induced distortion of the beam occur, the HR mirror 2 or etalon is preferably adjusted according to a predetermined construction. For this purpose, a feed back loop for stabilization is preferably used.

The undesirable limitation on the achievable degree of spectral purity of the beam 9 by background radiation originating from a single pass within the resonator is advantageously prevented using a resonator in accord with the preferred embodiments. Specifically, by final spectral selection at the front optics module, substantially all radiation emanating from the discharge chamber 1 will be line-narrowed or subject to selection at the output coupling side of the discharge chamber 1 before or as the beam 9 is output coupled. The spectral purity is additionally improved by the installation of one or more apertures 11a–11c, precisely adjusted at the position of the selected line. There are several possible embodiments which means that the apertures 11a, b, c can be selected in several ways. It is possible to design it with only one aperture 11a or 11b or 11c or with two apertures 11a and 11b or 11a and 11c or 11b and 11c, or with only all three apertures 11a–11c. An additional aperture may be inserted between the discharge chamber 1 and the dispersive element 4.

The output coupler 3 may be a partially reflective mirror 3, as described, or an elaton or another interferometric device. If an output coupling interferometer is used, it is preferably as set forth in U.S. patent application (serial number not yet assigned) to Kleinschmidt and Lokai, "Narrow Band Excimer or Molecular Fluorine Laser Having an Output Coupling Interferometer", filed Nov. 17, 2000, which is assigned to the same assignee as the present application, and which has priority to U.S. provisional application Ser. No. 60/166,277, or application Ser. No. 09/317,527, each application being hereby incorporated by reference. Alternatively, if an etalon output coupler is used, which is a special kind of interferometer having parallel plates, it may be the same or similar to that described in U.S. Pat. Nos. 5,901,163, 5,856,991 and 6,028,879, each of which is hereby incorporated by reference.

Figure 3:
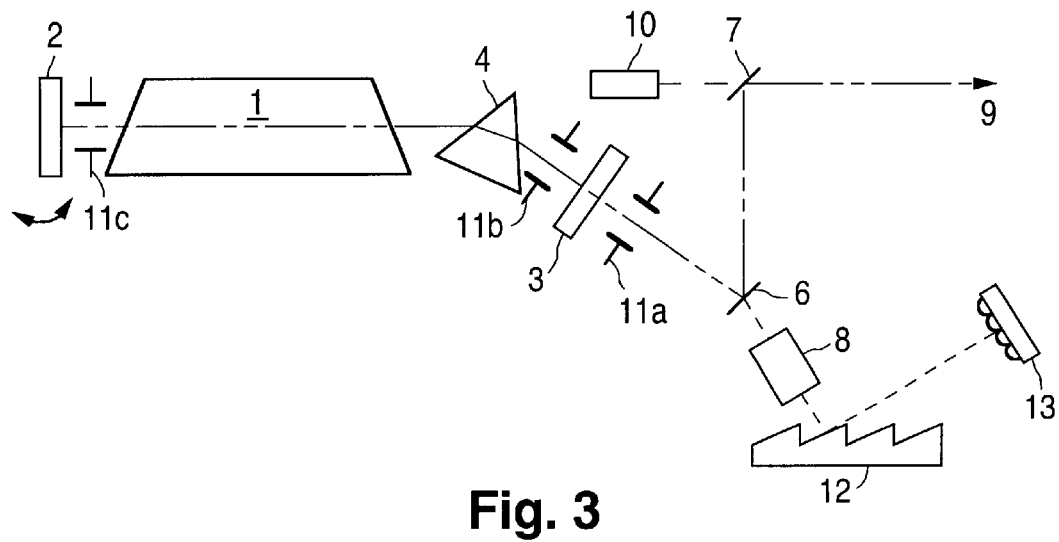
FIG. 3 schematically shows a line-narrowed laser resonator according to a second preferred embodiment.

Referring now to FIG. 3, a second embodiment similar to that shown and described with respect to FIG. 2 is shown. The only difference from the first embodiment is that an energy detector 8 is positioned to receive a portion of the radiation that is transmitted at mirror 6. As shown, some of the radiation that transmits the mirror 6 is used for energy detection, and preferably some the radiation is permitted to reach the grating 12 and array detector 13 for spectral monitoring and control of the beam 9. One skilled in the art would understand that there are many ways to position the energy detector, grating 12 and array detector to both monitor the energy and the spectral distribution of the beam 9. Advantageously, the beam energy and spectral distribution monitoring components are within a same unit, preferably along with the beam guiding laser 10 and optics 6, 7 and line-narrowing and output coupling optics 4, 3, 11a and/or 11b, at the output side of the discharge chamber 1.

Figure 4:
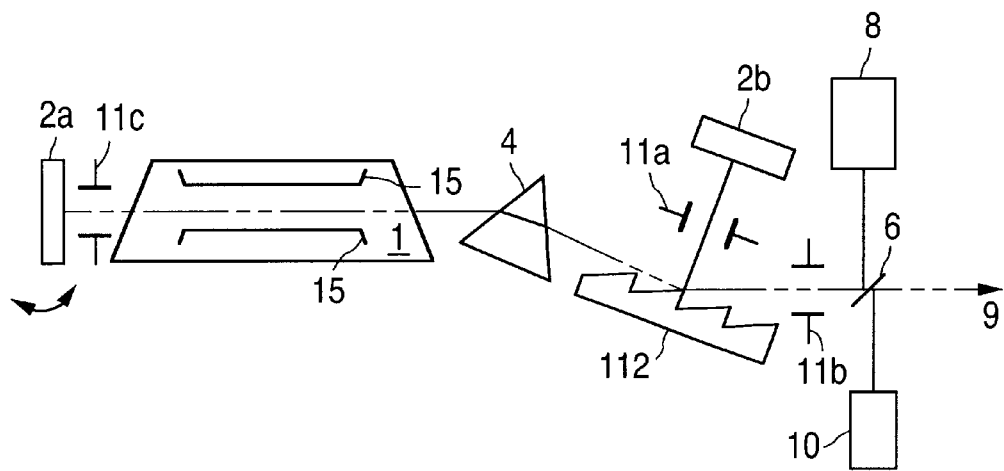
FIG. 4 schematically shows a line-narrowed laser resonator according to a third preferred embodiment.
Figure 5:
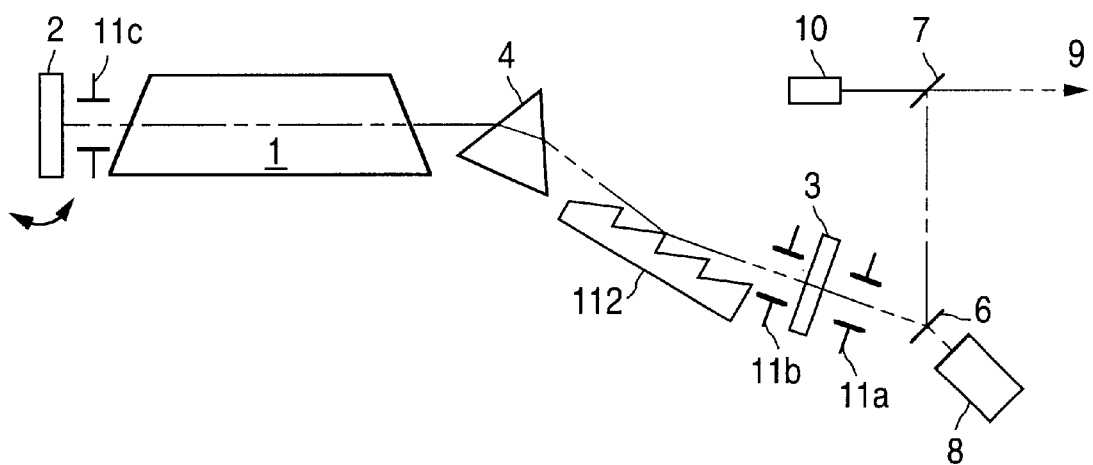
FIG. 5 schematically shows a line-narrowed laser resonator according to a fourth preferred embodiment.

Referring now to FIGS. 4 and 5, alternative embodiments using a grating for line selection and/or line narrowing are schematically shown and described below. According to these third and fourth embodiments, a reflective grating 112 is shown. The resonator includes the discharge chamber 1 with electrodes 15, the HR mirror 2a or highly reflective etalon, and prism 4, similar to those described with respect to FIGS. 2–3. In this case, the prism 4 may be a beam expanding prism or a dispersion prism, or the prism 4 may be excluded from the resonator. If one or more beam expanding prisms are used, the beam substantially totally reaches the grating 112 upon traversing the prisms, which also serve to reduce the beam divergence, rather than having a substantial portion dispersed away from the acceptance angle of the beam, while the grating 112 performs the line-narrowing and/or selection.

A highly reflective HR mirror 2b is shown as the second of the resonator reflectors of the laser resonator. The line-narrowed beam 9 is output as a grazing incidence reflection from the grating 112. Alternatively, a partially reflecting output coupling mirror may be disposed after the grating 112 to serve as the second of the resonator reflectors of the laser. Aperture 11a is shown disposed between the grating 112 and HR mirror 2b. Aperture 11b is shown disposed after the grating 112, and aperture 11c is disposed between the discharge chamber 1 and HR mirror 2a on the rear side of the discharge chamber 1. An aperture may be placed between the one or more prisms 4 and the grating 112, and an aperture may be placed between the discharge chamber 1 and the prism 4. Just as with the first and second embodiments, any number of the apertures 11a–11c or others may be used for matching or adapting the divergence of the resonator and serving to block unselected portions of the beam.

FIG. 4 also shows a beam splitter 6 for reflecting a portion of the beam 9 to an energy detector 8. As with the second embodiment of FIG. 3, a spectrometer may be disposed behind the detector 8, wherein the spectrometer would preferably include a grating 12 or monitor etalon and an array detector (not shown in FIG. 4, but see FIG. 3). A reference laser 10 is also shown in FIG. 4 for controlling the alignment of the beam 9. The reference laser beam is shown reflecting preferably from the same beam splitter 6. A second beam splitter may alternatively be used for this purpose.

FIG. 5 schematically shows a fourth embodiment that is similar to that shown in FIG. 4. A difference is that a partially reflective output coupler 3 is used rather than the HR mirror 2b of FIG. 4. Another difference between FIG. 5 and FIG. 4 is that the preferred arrangement of the fourth embodiment is the same as that of the second embodiment of FIG. 3 with respect to the arrangement of the energy detector 8, spectrometer including the grating 12 or monitor etalon and array detector 13 (not shown in FIG. 5, but see FIG. 3) and the reference laser 10 and reflective optics 6 and 7.

One skilled in the art would understand that the resonator could be differently configured with respect to the dispersive grating 112 for line-narrowing the beam 9. In addition, a transmission grating or transmissive or reflective grism could be used. The main point in the third and fourth embodiments is that the grating 112 performs the spectral selection, rather than the dispersive prism 4 of the first and second embodiments, although if the prism 4 of FIGS. 4 and 5 is used and is a dispersion prism, then each of the prism 4 and grating 112 would work together to select the spectral portion of the beam desired to be output from the resonator. The output beam 9 is either produced by the diffracted beam passing an output coupler 3 of a particular reflectivity R (e.g., R=10–40%) as in FIG. 5, or by the free propagation of the diffracted beam via grazing incidence as in FIG. 4.

In the above embodiments, it is possible to use an HR-mirror or an interferometer such as an etalon as the components 2, 2a, 2b, and a partially reflective mirror or interferometer such as an etalon may be used as the component 3. Furthermore, a prism 4 may be used in each of the first through fourth embodiment, notwithstanding that a grating 112 is used as a preferred dispersive element in the third and fourth embodiments. When a prism 4 is not used, an advantage is that compensating any deviations which may result from thermal heating of the prism 4, such as by tuning by adjusting the rotational alignment of the mirror 2 or 2a, would be obviated.

Figure 1:
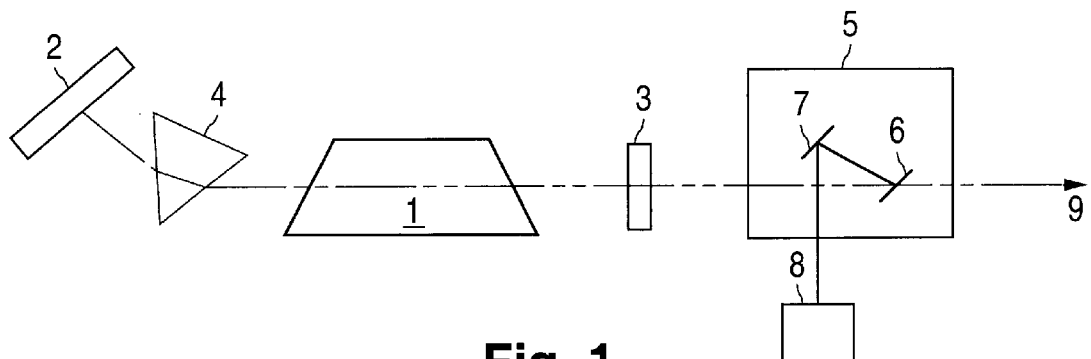
FIG. 1 schematically shows a conventional line-narrowed laser resonator with energy monitoring of the output beam.

Another advantage of the above embodiments, is that several beam splitters or shearing mirrors may be used to redirect the output beam direction. This feature easily enables the addition of monitoring modules, e.g., the energy monitor 8 and spectral wavelength module 12, 13 (grating 12 or etalon and CCD—camera 13; see FIGS. 2a, b). Arranging a reference laser 10 for beam alignment is also easily enabled. That is, the optical design permits the introduction of the guiding beam from the laser 10 to coincide with the main UV-beam. This beam alignment component is much more complicated to integrate into conventional designs such as that shown at FIG. 1, where several additional optical elements would be installed to realize pilot beaming.

Another advantage particularly for the molecular fluorine laser is that undesirable red atomic fluorine emission may be rejected from the beam splitting (shearing) path. For example, one or more of the beam splitters 6 and 7 may be configured to reflect the DUV or VUV light, while transmitting the red light away from the beam path. This red light suppression from the beam 9 would a more difficult design feature to incorporate with conventional designs such as that shown as FIG. 1.

The objects of the invention set forth above are thus met. The details of the front optics module provide an excimer or molecular fluorine laser system wherein background radiation originating from a single pass gain in the discharge chamber 1 is suppressed to improve the spectral purity of the output beam 9. In addition, a simplified laser resonator has been described in the above embodiments, particularly for use with an excimer or molecular fluorine laser system for such industrial applications as microlithography, TFT annealing and micro-machining, among others.

Figure 6:
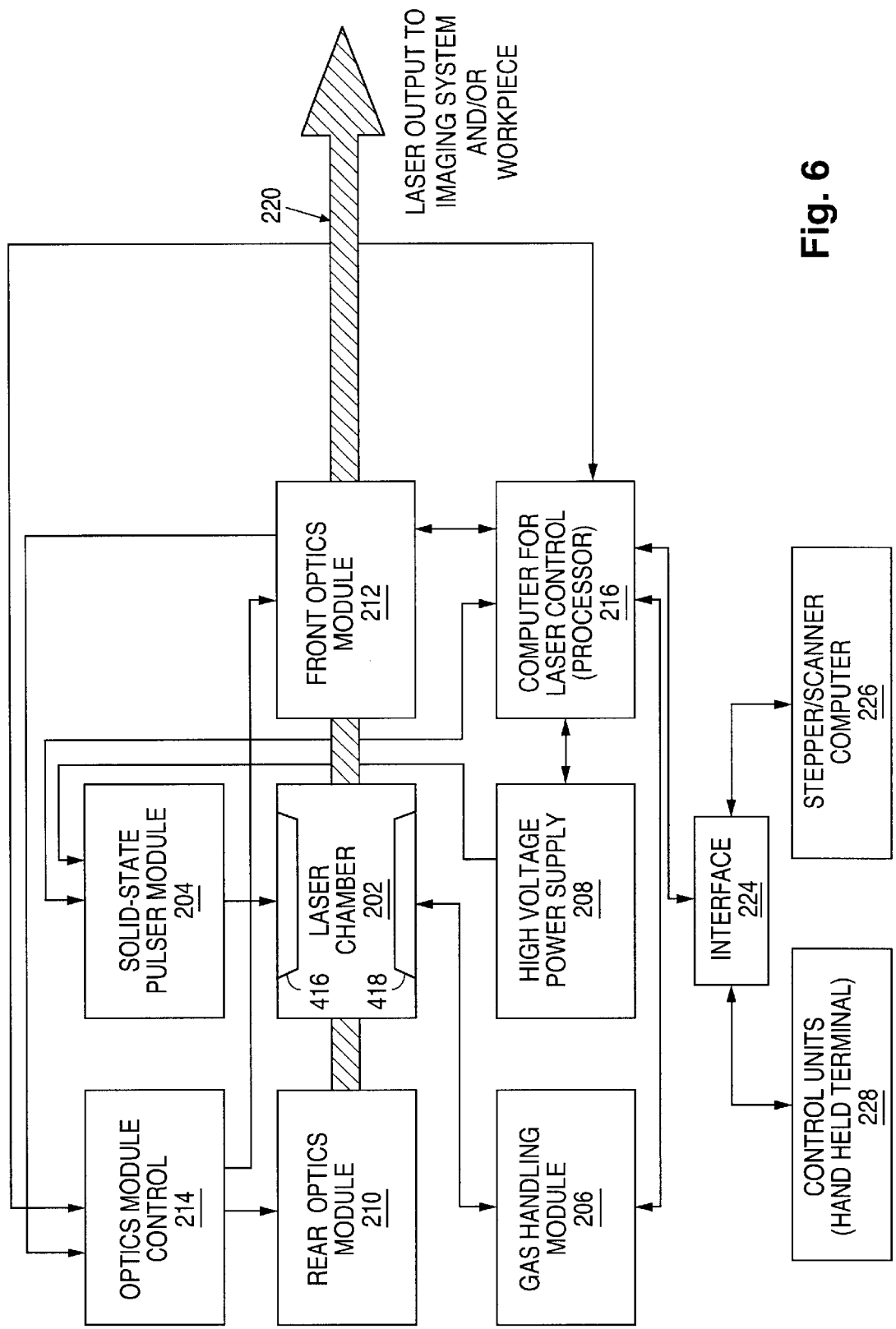
FIG. 6 schematically shows an excimer or molecular fluorine laser system according to a preferred embodiment.

Referring now to FIG. 6, the preferred excimer or molecular fluorine laser system will now be described. A gas discharge laser system, preferably a DUV or VUV laser system, such as an excimer, e.g., ArF or KrF, or molecular fluorine (F2) laser system for deep ultraviolet (DUV) or vacuum ultraviolet (VUV) lithography, is schematically shown at FIG. 6. Alternative configurations for laser systems for use in such other industrial applications as TFT annealing and/or micromachining, e.g., are understood by one skilled in the art as being similar to and/or modified from the system shown in FIG. 6 to meet the requirements of that application. For this purpose, alternative DUV or VUV laser system and component configurations are described at U.S. patent application Ser. Nos. 09/317,695, 09/317,526, 09/130,277, 09/244,554, 09/452,353, 09/317,527, 09/343,333, 60/122,145, 60/140,531, 60/162,735, 60/166,952, 60/171,172, 60/141,678, 60/173,993, 60/166,967, 60/147,219, 60/170,342, 60/162,735, 60/178,445, 60/166,277, 60/167,835, 60/171,919, 60/202,564, 60/204,095, 60/172,674, 09/574,921, 60/212,257, 60/212,301, 60/200,163, 60/198,058, 60/215,933 and 60/181,156, and U.S. Pat. Nos. 6,005,880, 6,061,382, 6,020,723, 5,946,337, 6,014,206, 5,559,816, 4,611,270, 5,761,236, 4,393,505, 4,977,573, 5,161,238 and 4,905,243, each of which is assigned to the same assignee as the present application, and those other references set forth above, are hereby incorporated by reference as disclosing alternative embodiments of elements or features of the preferred embodiments not otherwise set forth in detail herein. A single one or a combination of two or more of these references may be consulted to obtain a variation of the preferred embodiments described in the detailed description and within the scope of the present invention.

The system shown in FIG. 6 generally includes a laser chamber 202 having a pair of main discharge electrodes 46, 48, e.g., as described above with respect to FIGS. 2–5, connected with a solid-state pulser module 204, and a gas handling module 206. The solid-state pulser module 204 is powered by a high voltage power supply 208. The laser chamber 202 is surrounded by optics module 210 and optics module 212, forming a resonator. As understood from the above description, the optics module 210 preferably only includes a HR mirror or etalon, and optionally an aperture 11c, and is controlled by an optics control module 214, or may be alternatively directly controlled by a computer 216, particularly for controlling a rotational position of the mirror 2 or for controlling its curvature such as is described in U.S. patent application Ser. No. 09/452,353, which is assigned to the same assignee as the present application and is hereby incorporated by reference. the same module 214 or the computer 216 or another separate module may be used to control one or more of the optics in the front optics module 212.

The computer 216 for laser control receives various inputs and controls various operating parameters of the system. Diagnostic components 8, 10, 12 and 13 are each preferably used to receive and measure one or more parameters of a split off portion of the main beam 220 via optics for deflecting a small portion of the beam toward the diagnostic components of the front optics module 212, such as preferably one or more beam splitters 6, 7, above (with respect to the beam steering module utilizing the reference laser 10, preferably means for monitoring the alignment of the beam 220 with respect to the reference laser beam are included, such as are set forth as U.S. Pat. No. 6,014,206 or U.S. patent application Ser. No. 09/271,020, which is assigned to the same assignee as the present application, the '206 patent and '020 application being hereby incorporated by reference). As described above, the diagnostic components 8, 10, 12 and 13 are advantageously preferably integrated into a single front optics module 212. The beam 220, corresponding to the beam 9, above, is preferably the laser output to an imaging system (not shown) and ultimately to a workpiece (also not shown), and may be output directly to an application process. The laser control computer 216 communicates through an interface 224 with a stepper/scanner computer 226 and other control units 228.

LASER CHAMBER

The laser chamber 202, corresponding to laser chamber 1, above, contains a laser gas mixture and includes one or more preionization electrodes in addition to the pair of main discharge electrodes 46, 48. Preferred main electrodes 46 and 48 are described at U.S. patent applications Ser. Nos. 09/453,670, 60/184,705 and 60/128,227, each of which is assigned to the same assignee as the present application and is hereby incorporated by reference. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are described at United States patent application of Bragin et al, serial number not yet assigned, entitled Corona Preionization Assembly for a Gas Laser, filed Oct. 19, 2000, and details and alternative configurations are additionally set forth at U.S. patent application Ser. Nos. 60/162,845, 60/160,182, 60/127,237, 09/535,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

POWER SUPPLY CIRCUIT AND PULSER MODULE

The solid-state pulser module 204 and high voltage power supply 208 supply electrical energy in compressed electrical pulses to the preionization and main electrodes 46, 48 within the laser chamber 202 to energize the gas mixture. Components of the preferred pulser module and high voltage power supply may be described at U.S. patent applications Ser. Nos. 60/149,392, 60/198,058, 60/204,095, 09/432,348 and 09/390,146, and 60/204,095, and U.S. Pat. Nos. 6,005,880 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of one Joule of electrical power (see the '988 patent, mentioned above).

LASER RESONATOR

The laser resonator which surrounds the laser chamber 202 containing the laser gas mixture includes optics module 210 including preferably a high reflectivity mirror 2, 2a or the like in a laser system wherein line-narrowing is performed at the front optics module 212. A spectral filter external to the resonator may also be used. Line-narrowing optics may also be disposed in front of the HR mirror, for additional narrowing the linewidth of the output beam 220, if that is desired, in conjunction with the line-narrowing performed in the front optics module 212 as set forth above with respect to FIGS. 2–5.

The laser chamber 202 is sealed by windows transparent to the wavelengths of the emitted laser radiation 220. The windows may be Brewster windows or may be aligned at another angle, e.g., 5°, to the optical path of the resonating beam. One of the windows may include an interferometer such as an etalon or a birefringement plate for line-selection (see the 09/317,695 application).

EXTRA-RESONATOR FEATURES

After a portion of the output beam 220 passes the outcoupler of the optics module 212, that output portion impinges upon beam splitting and/or redirecting optics such as reflectors 6 and 7, as set forth above, for deflecting a portion of the beam to the diagnostic components such as the energy detector 8 and spectrometer 12, 13, or otherwise allowing a small portion of the outcoupled beam to reach the diagnostic components 8, 12, and 13, while a main beam portion 220 is allowed to continue as the output beam 220 of the laser system. Additional optics may redirect the beam to be collinear with a guiding beam from a reference laser 10, above. The energy detector 8 may include a photodiode. Preferred optics include a beamsplitter 6 or otherwise partially reflecting surface optic. The optics may also include a mirror or beam splitter 7 as a second reflecting optic. More than one beam splitter and/or HR mirror(s), and/or dichroic mirror(s) may be used to direct portions of the beam to diagnostic components 8, 12 and/or 13. In particular, it is preferred that one or more of the mirrors or beam splitters 6, 7 or others, transmit the red emission of the molecular fluorine laser while reflecting only the VUV light, or vice-versa, when the preferred embodiment are used with the molecular fluorine laser. A holographic beam sampler, transmission grating, partially transmissive reflection diffraction grating, grism, prism or other refractive, dispersive and/or transmissive optic or optics may also be used to separate a small beam portion from the main beam 220 for detection or redirection at or with respect to the diagnostic components 8, 12, 13, and 10. In any configuration, most of the main beam 220 is permitted to reach an application process directly or via an imaging system or otherwise.

The output beam 220 may be transmitted at a beam splitter 6 or 7, while a reflected beam portion is directed at the diagnostic components 8, 12, 13, or the main beam 220 may be reflected, while a small portion is transmitted to the diagnostic components 8, 12, 13. The portion of the outcoupled beam which continues past the beam splitters 6, 7 and not directed toward any of the diagnostic components 8, 12, 13 is the output beam 220 of the laser, which propagates toward an industrial or experimental application such as an imaging system and workpiece for photolithographic applications. Variations of beam splitter configurations not set forth above with respect to FIGS. 2–5, particularly for a molecular fluorine laser system are set forth at U.S. patent application Ser. Nos. 09/598,552 and 60/140,530, which are each assigned to the same assignee as the present application and are hereby incorporated by reference.

BEAM PATH ENCLOSURE

Also particularly for the molecular fluorine laser system, and for the ArF laser system, an enclosure (not shown) may seal the beam path of the beam 220 such as to keep the beam path free of photoabsorbing species. Smaller enclosures may seal the beam path between the chamber 202 and the optics modules 210 and 212. Advantageously, since the diagnostic components are preferably integrated into the front optics module, separate enclosure components that would otherwise be used between, e.g., a separate diagnostic module and beam splitter module, or between the front optics module and beam spliiter module, are not needed. The preferred enclosure is described in detail in U.S. patent application Ser. Nos. 09/343,333, 09/598,552, 09/594,892, 09/131,580 and 60/140,530, each of which is assigned to the same assignee and is hereby incorporated by reference, and alternative configuration are set forth at U.S. Pat. Nos. 5,559,584, 5,221,823, 5,763,855, 5,811,753 and 4,616,908, all of which are hereby incorporated by reference.

DIAGNOSTIC EQUIPMENT

The diagnostic equipment, which is preferably and advantageously contained within the front optics module 212, preferably includes at least one energy detector 8. This detector 8 measures the total energy of the beam portion that corresponds directly to the energy of the output beam 220 (see U.S. Pat. No. 4,611,270 and U.S. patent application Ser. No. 09/379,034, each of which is assigned to the same assignee and is hereby incorporated by reference). An optical configuration such as an optical attenuator, e.g., a plate or a coating, or other optics such as diffusers, apertures, etc. may be formed on or near the detector to control the intensity, spectral distribution and/or other parameters of the radiation impinging upon the detector (see U.S. patent application Ser. Nos. 09/172,805, 60/172,749, 60/166,952 and 60/178,620, each of which is assigned to the same assignee as the present application and is hereby incorporated by reference).

One other diagnostic component is preferably a wavelength and/or bandwidth detection component such as a monitor etalon or grating spectrometer (see above and U.S. patent application Ser. Nos. 09/416,344, 60/186,003, 60/158,808, 60/186,096, 60/186,096 and 60/186,096 and 60/202,564, each of which is assigned to the same assignee as the present application, and U.S. Pat. Nos. 4,905,243, 5,978,391, 5,450,207, 4,926,428, 5,748,346, 5,025,445, and 5,978,394, all of the above wavelength and/or bandwidth detection and monitoring components being hereby incorporated by reference. The spectrometer may be within a temperature and pressure controlled housing such as is described in the 60/158,808 application.

Other diagnostic components, which may be included in the front optics module 212 or in a separate module, may include a pulse shape detector or ASE detector, such as are described at U.S. patent application Ser. Nos. 09/484,818 and 09/418,052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level. There is preferably also a beam alignment monitor, e.g., as set forth above and/or as is described at U.S. Pat. No. 6,014,206 which is assigned to the same assignee and is hereby incorporated by reference.

CONTROL PROCESSOR

The processor or control computer 216 receives and processes values of some of the pulse shape, energy, ASE, energy stability, energy overshoot for burst mode operation, wavelength, spectral purity and/or bandwidth, among other input or output parameters of the laser system and output beam. The processor 216 also controls the line narrowing module to tune the wavelength and/or bandwidth or spectral purity, and controls the power supply and pulser module 204 and 208 to control preferably the moving average pulse power or energy, such that the energy dose at points on the workpiece is stabilized around a desired value. In addition, the computer 216 controls the gas handling module 206 which includes gas supply valves connected to various gas sources.

Further details of the control processor 216 such as for performing burst overshoot control and controlling the gas supply unit by monitoring total input energy to the discharge, among other parameters, for determining the timing and amounts of gas replenishment actions, are described at U.S. patent application Ser. No. 60/159,525, which is assigned to the same assignee as the present application and is hereby incorporated by reference.

GAS MIXTURE

The laser gas mixture is initially filled into the laser chamber 202 during new fills. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405 and 4,977,573 and U.S. patent application Ser. Nos. 09/317,526, 09/513,025, 60/124,785, 09/418,052, 60/159,525 and 60/160,126, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas, such as xenon, may be added for increased energy stability and/or as an attenuator as described in the 09/513,025 application incorporated by reference above. Specifically, for the $F_2$-laser, an addition of xenon and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%.

GAS REPLENISHMENT, GENERAL

Halogen and rare gas injections, total pressure adjustments and gas replacement procedures are performed using the gas handling module 206 preferably including a vacuum pump, a valve network and one or more gas compartments. The gas handling module 206 receives gas via gas lines connected to gas containers, tanks, canisters and/or bottles. Some prefered and alternative gas handling and/or replenishment procedures are described at U.S. Pat. Nos. 4,977, 573 and 5,396,514 and U.S. patent application Ser. Nos. 60/124,785, 09/418,052, 09/379,034, 60/159,525, 60/171, 717, and 60/159,525, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

LINE-NARROWING

A general description of the line-narrowing features of the preferred embodiment is provided here, followed by a listing of patent and patent applications being incorporated by reference as describing variations and features that may used with the preferred embodiments described above for providing an output beam with a high spectral purity or bandwidth (e.g., below 0.6 pm). Exemplary line-narrowing optics preferably contained in the optics module 212 include a beam expander, an optional etalon and a diffraction grating, which produces a relatively high degree of dispersion, for a narrow band laser such as is used with a refractive or catadioptric optical lithography imaging system. As referred to above, the front optics module 212 may include line-narrowing optics (e.g., outcoupling interferometer, birefringent plate, grating, grism) as well (see the 60/166,277, 60/173,993 and 60/166,967 applications, each being assigned to the same assignee and hereby incorporated by reference).

A beam expander, as optionally described above placed before the dispersive line-narrowing optics of the optics module 212, would preferably include one or more prisms. The beam expander may include other beam expanding optics such as a lens assembly or a converging/diverging lens pair.

The HR mirror 2, 2a, above, is preferably rotatable so that the wavelengths reflected into the acceptance angle of the beam or resonator can be selected or tuned. Alternatively, the grating 112, prism 4 or other optic or optics, or the entire line-narrowing module may be pressure tuned, such as is set forth in the 60/178,445 and 09/317,527 applications, each of which is assigned to the same assignee and is hereby incorporated by reference. A highly reflective mirror may be positioned before or after the grating which receives a reflection from the grating and reflects the beam back toward the grating 112, such as in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown and described in U.S. Pat. Nos. 4,399,540, 4,905,243, 5,226,050, 5,559,816, 5,659,419, 5,663,973, 5,761,236, and 5,946,337, and U.S. patent application Ser. Nos. 09/317,695, 09/130,277, 09/244,554, 09/317,527, 09/073,070, 60/124,241, 60/140, 532, 60/147,219 and 60/140,531, 60/147,219, 60/170,342, 60/172,749, 60/178,620, 60/173,993, 60/166,277, 60/166, 967, 60/167,835, 60/170,919, 60/186,096, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

Optics module 212 preferably includes means for outcoupling the beam 220, such as a partially reflective resonator reflector. The beam 220 may be otherwise outcoupled such as by an intra-resonator beam splitter or partially reflecting surface of another optical element, and the optics module 212 would in this case include a highly reflective mirror. The optics control module 214 preferably controls the optics modules 210 and 212 such as by receiving and interpreting signals from the processor 216, and initiating realignment or reconfiguration procedures (see the '241, '695, '277, '554, and '527 applications mentioned above).

The preferred embodiments described above relate to an excimer or molecular fluorine laser having line selection and/or line-narrowing optics at the output face of the resonator which, as has been discussed above, is distinguished from typical line-narrowed resonator designs such as for KrF, ArF, $F_2$-lasers. The optical elements that are used for line selection or line narrowing are integrated with the output coupling unit of the resonator, or serve as the output coupler themselves. An advantage is that wavelength and energy measuring components are all integrated into the output coupling unit. Another advantage is that a guiding beam or beam alignment component of the laser system for controlling the alignment of the beam may also be integrated into the same singular unit. Thus, all or nearly all components of the optical design of the laser system are contained in one unit, rather than in two units, i.e., the rear and front optics modules. Thus, a simplified resonator design is provided in accordance with one of the above objects. In addition, since the spectral selection is performed at the output end of the resonator, background radiation originating from a single pass gain in the discharge chamber is efficiently suppressed, in accordance with the other of the above objects, and thus the above objects are met.

The design of the preferred embodiments allows an advantageous improvement in the spectral purity of the beam. The advantageous design having line selection/narrowing at the front side of the resonator permits convenient integration of energy and wavelength monitoring as well as a beam alignment/guiding component. For the molecular fluorine laser, an additional advantage is that red light suppression is achieved without installation of additional optical components or energy losses. That is, the advantageous design permits efficient simultaneous red fluorine emission suppression which might otherwise be a problem for VUV-laser wafer illumination, wherein the resist is sensitive to red light.

The preferred embodiments described above may also be used for other lasers in addition to the molecular fluorine laser, for which the design is particularly advantageous, to improve spectral purity and suppress broadband background radiation or amplified spontaneous emission, e.g., for ArF and KrF excimer lithography lasers. For example, contrast in projection imaging onto wafers is improved. For tuning the wavelength of these lasers, the pointing direction is also efficiently stabilized. The methods or designs of the preferred embodiments can be used for any of a wide variety of narrow band or single line selection lasers, taking advantage of super background suppression by spectral cleaning directly at the output end of the laser resonator, wherein the last resonator transit is included in the line-narrowing/selection process.

In a preferred embodiment for the molecular fluorine laser, a line selection element is included for selecting radiation around 157 nm from visible-red emission of the molecular fluorine laser, and preferably for selecting a single line of multiple emission lines around 157 nm. The first line selection element preferably includes or is followed by an output coupling element or means for outcoupling the beam. In this way, a portion of the beam that has just been line narrowed is immediately output coupled without returning for another trip through the gain medium of the laser. A second line selection element may be included such that one line selection element selects a single line from two or three closely spaced lines around 157 nm and the visible red emission characteristically emitted by the molecular fluorine laser, while the other line selection element narrows the selected line.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. An excimer or molecular fluorine laser system, comprising:

a discharge chamber filled with a laser gas mixture at least including a halogen-containing gas and a buffer gas;

a power supply circuit including a pulser module powered by a high voltage power supply;

a plurality of electrodes within the discharge chamber connected to, and receiving electrical pulses from, the power supply circuit thereby energizing the gas mixture;

a resonator for generating a laser beam including the discharge chamber and a pair of resonator reflector elements, and the resonator including a line-narrowing module including at least one angularly-dispersive line-narrowing optical element on one side of the laser chamber reducing a bandwidth of the laser beam, wherein said angularly-dispersive line-narrowing optical element serves to disperse said beam such that only a selected portion of the spectral distribution of the beam incident at said angularly-dispersive line-narrowing optical element remains within a beam acceptance angle of said resonator, while other portions of the spectral distribution of the beam incident at said angularly-dispersive line-narrowing optical element propagate at angles away from said angularly-dispersive line-narrowing optical element greater than the beam acceptance angle;

a spectrometer including spectral monitoring components measuring one or more parameters of wavelength, bandwidth and spectral purity of a spectral distribution of the beam; and a processor for receiving a signal relating to the measured one or more parameters of the spectral distribution and controlling the line-narrowing module to tune at least one of the wavelength, bandwidth and spectral purity parameters of the beam;

wherein the laser beam is output coupled from the resonator on the same side of the laser chamber as said line-narrowing module; and wherein a substantially total intensity of said laser beam impinges upon said angularly-dispersive line-narrowing optical element of the line-narrowing module and is thereby line-narrowed before being outcoupled from the laser resonator, and particularly such that radiation emanating from the laser chamber and propagating toward said same side of the laser chamber, and which is output coupled on a first pass and never traverses optics on the opposite side of the laser chamber, passes through said angularly-dispersive line-narrowing optical element suppressing background radiation and improving spectral purity in the output beam.

2. The laser of claim 1, wherein the resonator only includes a highly reflective mirror at the other side of the discharge chamber from the line-narrowing module.

3. The laser of claim 1, wherein said aperture is disposed after said line-narrowing optical element and blocks unselected portions of the dispersed beam.

4. The laser of claim 3, wherein line-narrowing optical element is a dispersion prism and a substantial portion of said beam is dispersed away from said beam acceptance angle.

5. The laser of claim 1, wherein said line-narrowing module includes a partially reflective output coupler.

6. The laser of claim 1, wherein said line-narrowing optical element is a diffraction grating.

7. The laser of claim 6, further comprising a prism before said grating.

8. The laser of claim 7, wherein said prism is a beam expanding prism and at least a substantial portion of said beam incident at said prism is also incident at said grating.

9. The laser of claim 7, wherein said prism is a dispersion prism and a substantial portion of said beam is dispersed away from said beam acceptance angle such that said dispersed away portions are not incident at said grating.

10. The laser of claim 7, wherein said prism is a dispersion prism and a single line is selected among a plurality of molecular fluorine emission lines around 157 nm, which line is then incident upon said grating for narrowing of said selected line, while at least one unselected line and a visible emission are dispersed outside the beam acceptance angle.

11. The laser of claim 1, wherein the line-narrowing optical element is a dispersion prism and a substantial portion of the beam is dispersed away from the beam acceptance angle and blocked by the aperture.

12. The laser of claim 11, further comprising a partially reflective output coupler.

13. The laser of claim 1, wherein the line-narrowing optical element is a dispersion prism and a single line is selected among a plurality of molecular fluorine emission lines around 157 nm, while visible radiation and at least one unselected line are dispersed outside the beam acceptance angle.

14. The laser of claim 13, further comprising an output coupling interferometer tuned for maximum reflection of a central portion of the selected line and for suppression of outer portions of the selected line to narrowed the selected line.

15. The laser of claim 13, further comprising an intracavity interferometer tuned for maximum transmission of a central portion of the selected line and for suppression of outer portions of the selected line to narrowed the selected line.

16. The laser of claim 1, wherein the line-narrowing optical element is a dispersion prism and a molecular fluorine emission around 157 nm is selected, while visible atomic fluorine emission is dispersed outside the beam acceptance angle.

17. The laser of claim 16, wherein the line-narrowing module further comprises a grating for selecting one of a plurality of closely-spaced lines around the selected 157 nm molecular fluorine emission spectrum.

18. The laser of claim 1, further comprising a reference laser for aligning the line-narrowed output beam of the excimer or molecular fluorine laser after the beam is out-coupled from the resonator, and wherein said reference laser and said line-narrowing module are disposed within a same modular unit of said laser system.

19. The laser of claim 1, further comprising a detector after the line-narrowing module for monitoring an output beam parameter, and wherein said detector and said line-narrowing module are disposed within a same modular unit of said laser system.

20. The laser of claim 19, wherein the output beam parameter is power.

21. The laser of claim 19, wherein the output beam parameter is pulse energy, such that an energy stability of said beam is controlled.

22. The laser of claim 19, wherein the output beam parameter is beam profile.

23. The laser of claim 19, wherein the output beam parameter is bandwidth.

24. The laser of claim 19, further comprising a wavemeter for monitoring a spectral parameter of said beam, and wherein said wavemeter, said detector and said line-narrowing module are disposed within said same modular unit of said laser system.

25. The laser of claim 1, further comprising a wavemeter for monitoring a spectral parameter of said beam, and wherein said wavemeter and said line-narrowing module are disposed within said same modular unit of said laser system.

26. The laser of any of claims 24 or 25, wherein the wavemeter comprises a grating and an array detector.

27. The laser of any of claims 24 or 25, wherein the wavemeter comprises a Fabry-Perot etalon and an array detector.

28. The laser of claim 1, further comprising an output coupling interferometer tuned for maximum reflection of a central portion of the line-narrowed beam and for suppression of outer portions of the beam to further narrow the beam.

29. The laser of claim 1, further comprising an intracavity interferometer tuned for maximum transmission of a central portion of the line-narrowed beam and for suppression of outer portions of the beam to further narrow the beam.

30. An excimer or molecular fluorine laser system as in claim 1, further comprising at least one aperture at least in part defining said acceptance angle of said resonator.

31. The laser of claim 30, said aperture being disposed after said line-narrowing optical element and said aperture blocks unselected portions of the dispersed beam.

32. The laser of claim 30, said aperture being disposed outside the resonator after the output coupler.

33. The laser of claim 30, said aperture being a first aperture disposed after said line-narrowing optical element within the resonator for blocking unselected portions of the dispersed beam, and wherein said laser system further comprises a second aperture disposed outside the resonator after the output coupler.

34. The laser of claim 1, wherein the line-narrowing optical element is a dispersion prism and a substantial portion of said beam is dispersed away from said beam acceptance angle by the dispersion prism.

35. The laser of claim 1, wherein said line-narrowing optical element is a diffraction grating.

36. The laser of claim 1, further comprising a reference laser for aligning the line-narrowed output beam of the excimer or molecular fluorine laser after the beam is out-coupled from the resonator, and wherein said reference laser and said line-narrowing module are disposed within a same modular unit of said laser system.

37. The laser of claim 1, comprising a detector after the line-narrowing module for monitoring an output beam parameter, and wherein said detector and said line-narrowing module are disposed within a same modular unit of said laser system.

38. The laser of claim 37, wherein the output beam parameter is power.

39. The laser of claim 37, wherein the output beam parameter is pulse energy, such that an energy stability of said beam is controlled.

40. The laser of claim 37, wherein the output beam parameter is beam profile.

41. The laser of claim 37, wherein the output beam parameter is bandwidth.

42. The laser of claim 37, further comprising a wavemeter for monitoring a spectral parameter of said beam, and wherein said wavemeter, said detector and said line-narrowing module are each disposed in a same modular unit of said laser system.

43. The laser of claim 37, further comprising a wavemeter for monitoring a spectral parameter of said beam, and wherein said wavemeter and said line-narrowing module are disposed in a same modular unit of said laser system.

44. A high repetition rate excimer or molecular fluorine laser system, comprising:
a discharge chamber filled with a laser gas mixture at least including a halogen-containing gas and a buffer gas;
a power supply circuit including a pulser module powered by a high voltage power supply;
a plurality of electrodes within the discharge chamber connected to, and receiving electrical pulses from, the power supply circuit thereby energizing the gas mixture at a repetition rate of at least 2 kHz;
a resonator for generating a laser beam including the discharge chamber and a pair of resonator reflector elements, and the resonator including at least one line-narrowing optical element and at least one aperture for reducing a bandwidth of the laser beam;
a spectrometer including spectral monitoring components measuring one or more parameters of wavelength, bandwidth and spectral purity of a spectral distribution of the beam; and
a processor for receiving a signal relating to the measured one or more parameters of the spectral distribution and controlling the line-narrowing module to tune at least one of the wavelength, bandwidth and spectral purity parameters of the beam;
wherein said line-narrowing optical element serves to disperse said beam such that only a selected portion of the spectral distribution of the beam incident at said line-narrowing optical element remains within a beam acceptance angle defined in part by said aperture; and
wherein said aperture is cooled, thereby resisting heat build-up due to exposure to the high repetition rate beam, to prevent distortions due to thermal heating of the aperture.

45. The laser of claim 44, wherein said repetition rate is at least 4 kHz.

46. The laser of claim 44, wherein said repetition rate is at least 8 kHz.

47. The laser of any of claims 44–46, wherein said aperture includes at least one blocking wall portion for reflecting part of an incident beam impinging upon said blocking wall portion away from the aperture in a direction inclined relative to the optical axis, thereby further resisting heat build-up due to exposure to the high repetition rate beam.

48. The laser of any of claims 44–46, wherein said aperture is thermally connected to cooling liquid for carrying away heat induced at said aperture by exposure to the high repetition rate beam.

49. The laser of claim 48, wherein said flowing cooling liquid is flowing water.

50. The laser of claim 48, wherein said flowing cooling liquid is cyrogenic fluid.

51. The laser of claim 50, wherein said cryogenic fluid is liquid nitrogen.

52. The laser of claim 50, wherein said cryogenic fluid is thermally connected to said aperture via a thermally conductive metal.

53. The laser of any of claims 44–46, wherein said aperture is cooled by a fan disposed to blow a gas at said aperture.

54. The laser of any of claims 44–46, wherein said beam is output coupled after said beam is line-narrowed at said at least one line-narrowing optical element.

55. An excimer or molecular fluorine laser system, comprising:
a discharge chamber filled with a laser gas mixture at least including a halogen-containing gas and a buffer gas;
a power supply circuit including a pulser module powered by a high voltage power supply;
a plurality of electrodes within the discharge chamber connected to, and receiving electrical pulses from, the power supply circuit thereby energizing the gas mixture;
a resonator for generating a laser beam including the discharge chamber and a pair of resonator reflector elements, and the resonator including at least one line-narrowing optical element on one side of the discharge chamber for reducing a bandwidth of the laser beam;
a spectrometer including spectral monitoring components measuring one or more parameters of wavelength, bandwidth and spectral purity of a spectral distribution of the beam;
a processor for receiving a signal relating to the measured one or more parameters of the spectral distribution and controlling the line-narrowing module to tune at least one of the wavelength, bandwidth and spectral purity parameters of the beam, wherein a substantially total intensity of said laser beam impinges upon said at least one line-narrowing optical element and is thereby line-narrowed before being outcoupled from the laser resonator, and particularly such that radiation emanating from the laser chamber and propagating toward said same side of the laser chamber, and which is output coupled on a first pass and never traverses optics on the opposite side of the laser chamber, passes through said angularly-dispersive line-narrowing optical element suppressing background radiation and improving spectral purity in the output beam; and
wherein said line-narrowing optical element serves to disperse said beam such that only a selected portion of the spectral distribution of the beam incident at said line-narrowing optical element remains within a beam acceptance angle; and
wherein the laser beam is output coupled from the resonator on the same side of the discharge chamber as the at least one line-narrowing optical element, and said line-narrowing optical element is disposed in a same modular unit from which said beam is output coupled.

56. The laser of claim 55, wherein the resonator only includes a highly reflective mirror at the other side of the discharge chamber from the line-narrowing module.

57. The laser of claim 55, further comprising a reference laser for aligning the line-narrowed output beam of the excimer or molecular fluorine laser after the beam is out-coupled from the resonator, and wherein said reference laser and said line-narrowing optical element and said reference laser are disposed is said same modular unit of said laser system from which said beam is output coupled.

58. The laser of claim 55, further comprising a detector after the line-narrowing module for monitoring an output beam parameter, and wherein said detector and said line-narrowing optical element are disposed within said same modular unit of said laser system from which said beam is output coupled.

59. The laser of claim 58, wherein the output beam parameter is power.

60. The laser of claim 58, wherein the output beam parameter is pulse energy, such that an energy stability of said beam is controlled.

61. The laser of claim 58, wherein the output beam parameter is beam profile.

62. The laser of claim 58, wherein the output beam parameter is bandwidth.

63. The laser of claim 58, further comprising a wavemeter for monitoring a spectral parameter of said beam, and wherein said wavemeter, said detector and said line-narrowing optical element are each disposed in said same modular unit of said laser system from which said beam is output coupled.

64. The laser of claim 55, further comprising a wavemeter for monitoring a spectral parameter of said beam, and wherein said wavemeter and said line-narrowing optical element are disposed in said same modular unit of said laser system from which said beam is output coupled.

65. The laser of any of claims 63 or 64, wherein the wavemeter comprises a grating and an array detector.

66. The laser of any of claim 63 or 64, wherein the wavemeter comprises a Fabry-Perot etalon and an array detector.

67. An excimer or molecular fluorine laser system, comprising:

a discharge chamber filled with a laser gas mixture at least including a halogen-containing gas and a buffer gas;

a power supply circuit including a pulser module powered by a high voltage power supply;

a plurality of electrodes within the discharge chamber connected to, and receiving electrical pulses from, the power supply circuit thereby energizing the gas mixture;

a resonator for generating a laser beam including the discharge chamber and a pair of resonator reflector elements, the resonator including a line-narrowing module including at least one line-narrowing optical element on one side of the laser chamber and at least one aperture for reducing a bandwidth of the laser beam, wherein said line-narrowing optical element serves to disperse said beam such that only a selected portion of the spectral distribution of the beam incident at said line-narrowing optical element remains within a beam acceptance angle as defined at least in part by said aperture; a spectrometer including spectral monitoring components measuring one or more parameters of wavelength, bandwidth and spectral purity of a spectral distribution of the beam; and a processor for receiving a signal relating to the measured one or more parameters of the spectral distribution and controlling the line-narrowing module to tune at least one of the wavelength, bandwidth and spectral purity parameters of the beam;

wherein the laser beam is output coupled from the resonator on the same side as the line-narrowing module by polarization coupled reflection from an optical surface, such that radiation emanating from the laser chamber and propagating toward said same side of the laser chamber, and which is output coupled on a first pass and never traverses optics on the opposite side of the laser chamber, passes through said angularly-dispersive line-narrowing optical element suppressing background radiation and improving spectral purity in the output beam.

* * * * *